United States Patent Office 2,770,649
Patented Nov. 13, 1956

2,770,649 o-METHOXYPHENOXY-2-HYDROXY-PROPYL CARBAMATES

Robert S. Murphey, Richmond, Va., assignor to A. H. Robins Company, Inc., Richmond, Va.

No Drawing. Application June 22, 1955,
Serial No. 517,387

3 Claims. (Cl. 260—482)

This invention relates to the alkoxyphenoxy-2-hydroxy-propyl carbamates and to N-substituted derivatives thereof. The invention is more particularly directed to the 3-o-alkoxy-2-hydroxy-propyl carbamate species of this group of compounds, e. g., the 3-o-methoxyphenoxy-2-hydroxy-propyl carbamates, and their N-mono or dilower-alkyl substituted derivatives.

PRIOR ART

The compounds which are the subject of this invention are related to compounds of well known therapeutic value 3-o-toloxy-1,2-propanediol (mephenesin), 3-o-methoxy-phenoxy-1,2-propanediol (glyceryl guaiacolate), and 3-o-toloxy-2-hydroxy-propyl carbamate (Tolseram—U. S. 2,609,386, Lott et al.).

The prior art compounds have been found useful for muscle relaxant conditions susceptible to myanesin therapy where the action is central with some slight myoneural depression. The sites of the depression appear to be in the brain stem at the level of the thalamus and below and in the spinal cord. Such action is characterized by producing weakness and flaccidity of the skeletal muscle. The complementary sedative effects of these compounds as well as the muscle relaxant action are temporary in nature lasting for mephenesin for a period of about an hour after administration. It has been found that the shortened activity of these drugs is due to the rapid oxidative effect on the terminal hydroxyl group generally appearing in these compounds. It is known, for example, that mephenesin (Myanesin, Tolserol) is rapidly detoxified by conversion to inactive metabolites and large quantities of the metabolite β(o-toloxy)-lactic acid are excreted following administration. These compounds are of limited solubility and in some instances are prone to cause hemolysis or blood damage as well as hematuria.

Therefore it is an object of the present invention to provide novel alkoxy substituted-phenoxy-2-hydroxy propyl carbamates.

It is a further object to provide novel compounds of prolonged muscle relaxing activity by an effective blocking of the terminal hydroxy group in these compounds and by the inclusion of an alkoxy group in the aromatic ring fraction.

It is a further object of this invention to provide compounds of decreased adverse hemolytic action.

Thus, this invention comprises a novel group of alkoxy substituted phenoxy-2-hydroxy-propyl carbamates. It is specially directed to compounds in which the alkoxy group is ortho substituted on the aromatic fraction. Included specifically among these compounds is the 3-o-methoxyphenoxy-2-hydroxy-propyl carbamate.

These compounds have well recognized utility in muscle relaxant qualities by comparison with the well known glyceryl guaiacolate and mephenesin type compounds described above.

In addition pharmacological studies indicate that these compounds have utility as anti-convulsive agents in electric shock (EST) and Metrazol shock therapy.

The compounds of the present invention are prepared from known starting materials, i. e., the alkoxy substituted phenoxy-1,2 propane diols. These are prepared in the following manner:

For example, 3-o-methoxyphenoxy-1,2-propanediol is conveniently prepared by heating the sodium or potassium salt of guaiacol (o-methoxyphenol) with glycerol monochlorohydrin in a non-aqueous solvent. Sodium or potassium chloride and 3-o-methoxyphenoxy-1,2-propanediol are formed. The salt is conveniently removed by filtration, the solvent is removed by distillation and the residual syrup is fractionated at low pressure. The product may be further purified by recrystallization from water, carbon tetrachloride or toluene. The pure white crystalline material melts at 78–79° C. 3-o-methoxyphenoxy-1,2-propanediol is available commercially from The New York Quinine and Chemical Works, New York, New York.

These starting compounds are reacted with equimolar quantities of phosgene in organic solvents, preferably benzene to provide an intermediate chloro carbonate compound. This initial phase of the reaction is conducted in the presence of an equimolar portion of an organic amine base such as pyridine or dimethyl aniline. Thereafter the chloro carbonate intermediate is reacted with ammonia or ammonium hydroxide to produce the desired alkoxy substituted carbamate. The crude product is obtained as a precipitate and is further purified as by recrystallization. Yields of up to 66% of the theoretical are consistently achieved.

The following examples illustrate a specific procedure for preparing the compounds of this invention:

Example 1

To a stirred suspension of 198.2 grams (1.0 mole) of 3-o-methoxyphenoxy-1,2-propanediol in 1000 ml. of dry benzene contained in a five liter, three neck, round bottom flask equipped with a thermometer, dropping funnel and blade stirrer, was added dropwise (in 30 minutes) a solution of 98.9 grams (1.0 mole) of phosgene in 400 milliliters of cold dry benzene. The mixture was stirred at 30° centigrade until all solid material dissolved (about 3 hours was required) and stirring was continued for 30 minutes longer. To this mixture was added dropwise 79.1 grams (1.0 mole) of dry pyridine, the temperature being held below 30° centigrade by cooling. After addition of the pyridine, stirring at 30° centigrade was continued for 30 minutes.

The mixture was cooled to 7° C., extracted with two 500 cc. portions of ice water to remove pyridine hydrochloride and the benzene solution of 3-o-methoxyphenoxy-2-hydroxypropyl chlorocarbonate was added to 500 milliliters of cold concentrated ammonium hydroxide. The mixture was vigorously stirred at 5° centigrade for six hours, then the crude white precipitate of 3-o-methoxyphenoxy-2-hydroxypropyl carbamate was filtered off, dissolved in 1500 milliliters of hot benzene and completely dried by codistillation of last traces of water with benzene, treated with decolorizing carbon and filtered while hot. On cooling 160 grams of product crystallized as white needles melting at 88–90° centigrade. Recrystallization furnished a white crystalline powder melting at 92–94° centigrade and identified as the 3-o-methoxyphenoxy-1,2-propanediol.

*Analysis.*—Calculated for $C_{11}H_{15}NO_5$: Percent C, 54.76; percent H, 6.27; percent N, 5.81. Found: Percent C, 54.69; percent H, 6.23; percent N, 5.86.

The product formed was in appearance a white crystalline powder which was odorless and exhibited a bitter taste. This 3-o-methoxyphenoxy-2-hydroxy-propyl carbamate was quite soluble in hot water (100 mg./5 cc. in 20° centigrade water) and soluble in alcohols.

The invention further contemplates the N-substituted derivatives of these alkoxyphenoxy-propanediol carbamates. The nitrogen may be mono- or di-substituted, preferably with alkyl radicals. Included specifically are the N,N-dimethyl-alkoxy phenyl propanediol carbamates, e. g., the N,N-dimethyl-3-o-methoxyphenoxy-2-hydroxy-propyl carbamate. This compound has been prepared according to the following Example II following the procedure of the preceding Example I through the preparation of the intermediate 3-o-methoxyphenoxy-2-hydroxy-propyl chlorocarbonate and the treatment with ice water to remove pyridine hydrochloride.

*Example II*

The benzene solution of 3-o-methoxyphenoxy-2-hydroxy-propyl chlorocarbonate was added to 500 cc. of a cold aqueous solution containing 270 grams (6.0 moles) of dimethylamine in a five liter, three neck, round bottom flask immersed in an ice bath. The mixture was stirred and cooled for 6 hours, the benzene layer was separated, the benzene was removed by vacuum fractionation and the residual oil was fractionated to give 222 grams (0.825 mole, 82.5%) of a clear, straw colored oil boiling at 172–178° C. at 0.1 mm. and identified as N,N-dimethyl-3-o-methoxyphenoxy-2-hydroxy-propyl carbamate.

*Analysis.*—Calculated for $C_{13}H_{19}NO_5$: Percent N, 5.21. Found: Percent N, 5.10.

The compounds of the present invention are generally light colored, crystalline solids having well defined melting points or straw colored oils. Their solubilities (about 3.0%) are uniquely greater than those exhibited by the mephenesin-type compounds.

The outstanding therapeutic characteristics of these compounds is their markedly lengthened duration of action as compared with both the mephenesin and glyceryl guaiacolate type drugs. This has been established by animal studies and by chemical measurement of human blood concentrations. The superiority of these novel compounds may be attributed structurally to the inclusion of both the alkoxy grouping substituted in the ortho position on the phenoxy radical and to the carbamate grouping in the same molecule.

The latter carbamyl radical may cause delay of the metabolic oxidative inactivation of these compounds in the human body.

These compounds exhibit pronounced anti-electroshock and anti-convulsant activity. For example, animal studies show that the 3-o-methoxyphenoxy-2-hydroxy-propyl carbamate compound causes lasting depression of the pathways mediating the tonic extensor convulsions when electroshock stimuli are applied to the brain and shown a significally more potent and longer lasting anti-electroshock activity than either mephenesin or mephenesin carbamate. It also exhibits an enduring anti-strychnine activity superior to both the mephenesin and glyceryl guaiacolate type compounds.

Blood level studies from both the oral and intravenous administration in animals demonstrate the higher retention of drug levels than for glyceryl guaiacolate compounds. For example, the blood level of the 3-o-methoxyphenoxy-2-hydroxy-propyl carbamate member was higher than for glyceryl guaiacolate for a period of time of from 1 to 7 hours following administration, the increased retention becoming pronounced by the second hour. In addition it has been found that this compound is well absorbed in dogs fed large doses and has a slower disappearance rate than those for mephenesin and mephenesin carbamate.

The hemolytic activity was compared to both mephenesin and glyceryl guaiacolate compounds in both animal and human blood studies. Computations of the percent hemolysis were made, the results indicating substantially less hemolytic activity than for the mephenesin type drugs. Hemolysis was slightly more than for the glyceryl guaiacolate type agents.

The novel compounds, in addition to their anti-convulsant properties, exhibit a definite flaccid curare-like paralysis. A greater margin of safety at effective dosage level was observed for the 2-o-methoxyphenoxy-2-hydroxy propyl carbamate than for the curare drugs.

These compounds also exhibit mephenesin like depressant activity. Further animal studies of 3-o-methoxyphenoxy 2-hydroxy-propyl carbamate show that this compound exhibits a selective depressant action on multi-euronal reflexes and that this inhibition of multisynaptic reflexes is slower in onset and longer lasting than that of mephenesin.

The novel compounds are potent pentylenetetrazole (Metrazole) antagonists. Protection for mice and rats against otherwise fatal dosages of pentylenetetrazole was complete. For example, animal studies indicate that 3-o-methoxyphenoxy-2-hydroxy-propyl carbamate exerts an anti-pentylene tetrazole activity which exceeds that of mephenesin, glyceryl guaiacolate or mephenesin carbamate.

The derivatives of this invention may be embodied in the same pharmaceutical forms as 3-ortho-toloxy-1,2-propanediol, e. g., capsules, tablets, solutions and elixirs; and may be administered in the same manner and in substantially equivalent doses.

The invention may be variously otherwise embodied—as by putting the derivative of this invention into other pharmaceutical forms adapted to utilize its different properties, such as solubility.

It is to be understood that the compounds of the present invention may be modified without departing from the spirit or scope thereof. The invention is therefore limited only by the scope of the appended claims.

I claim:

1. A compound selected from the group consisting of 3-o-methoxyphenoxy-2-hydroxy-propyl carbamate and N-lower alkyl derivatives thereof.

2. 3-o-methoxyphenoxy-2-hydroxy-propyl carbamate.

3. N,N - dimethyl - 3 - o - methoxyphenoxy - 2 - hydroxy-propyl carbamate.

References Cited in the file of this patent

UNITED STATES PATENTS 2,609,386    Lott et al. _____ Sept. 2, 1952

OTHER REFERENCES

Marle: J. Chem. Soc. (London), v. 101 (1919), p. 312.